United States Patent
Zhang et al.

(10) Patent No.: US 11,294,740 B2
(45) Date of Patent: Apr. 5, 2022

(54) EVENT TO SERVERLESS FUNCTION WORKFLOW INSTANCE MAPPING MECHANISM

(71) Applicant: Huawei Technologies Co., Ltd., Shenzhen (CN)

(72) Inventors: Hong Zhang, Palo Alto, CA (US); Henry Louis Fourie, Livermore, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/544,601

(22) Filed: Aug. 19, 2019

(65) Prior Publication Data

US 2020/0012545 A1    Jan. 9, 2020

Related U.S. Application Data

(63) Continuation of application No. PCT/US2019/018625, filed on Feb. 19, 2019.

(60) Provisional application No. 62/637,211, filed on Mar. 1, 2018.

(51) Int. Cl.
*G06F 9/54* (2006.01)
*G06F 9/48* (2006.01)
*H04L 67/10* (2022.01)

(52) U.S. Cl.
CPC ............ *G06F 9/542* (2013.01); *G06F 9/4843* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,954,526 | B2* | 2/2015 | Arthursson | H04L 67/2842 709/217 |
| 9,306,939 | B2* | 4/2016 | Chan | H04L 67/2842 |
| 10,097,551 | B2* | 10/2018 | Chan | H04L 67/2842 |
| 10,521,280 | B2* | 12/2019 | Zhang | G06F 9/542 |
| 10,528,367 | B1* | 1/2020 | Liu | G06F 9/455 |
| 10,565,034 | B2* | 2/2020 | Zhang | G06F 9/4881 |
| 2010/0010858 | A1* | 1/2010 | Matoba | G06Q 10/06 705/7.27 |
| 2017/0192877 | A1* | 7/2017 | Falk | H04L 67/10 |

(Continued)

FOREIGN PATENT DOCUMENTS

EP    3128423 A1    2/2017

OTHER PUBLICATIONS

PCT Application No. PCT/US2019/018625 filed Feb. 19, 2019.

(Continued)

*Primary Examiner* — Umut Onat
(74) *Attorney, Agent, or Firm* — Vierra Magen Marcus LLP

(57) ABSTRACT

A network mapping events to workflow instances. One or more event messages are received with an embedded token from one or more event sources associated with an application. A workflow specification is received that specifies a location of the token embedded in the one or more event messages, and the token is extracted from the one or more event messages using the location of the token specified in the workflow specification. The events are then mapped to a workflow instance of the application based on the token the one or more event messages.

16 Claims, 10 Drawing Sheets

(56) References Cited

U.S. PATENT DOCUMENTS

2018/0225158 A1* 8/2018 Guigui .................. G06F 9/542
2018/0357333 A1* 12/2018 Isherwood ............ G06F 16/901

OTHER PUBLICATIONS

AWS Step Functions Developer Guide, 2019 Amazon Web Services, Inc., 236 pages.
CNCF WG-Serverless Whitepaper, Jul. 26, 2017, Ken Owens et al., 34 pages.
JSONPath Online Evaluator, Jan. 29, 2019, Kazuki Hamasaki.
Microservice Orchestration for Serverless Computing, May 10, 2017, Cathy Zhang, 20 pages.
International Search Report dated May 7, 2019, in PCT Application No. PCT/US2019/018625, 13 pages.

* cited by examiner

Specification 402

```
{
  "event-defs":
   "HTTP-event": {
     "correlation-token": $.headers.body.x-house-number
   }
}
```

HTTP API Gateway Event Data 402A

```
{
  "body": "",
  "requestContext": {
    "apiId": "bc1dcfd53425a4c08e",
    "requestId": "11cdcdca13091c77"
  },
  "queryStringParameters": {
    "responseType": "html"
  },
  "httpMethod": "POST",
  "headers": {
    "accept-language": "en",
    "accept-encoding": "gzip, deflate, br",
    "x-house-number":"20 middlefield street"
  },
}
```

*FIG. 4A*

Specification 404

```
{
  "event-defs":
   "OBS-event": {
     "correlation-token: $.Records[0].obs.metadata.x-house-number
   }
}
```

OBS Event Data 404A

```
{
 "Records": [
    {
      "eventVersion": "2.0",
      "eventTime": "2018-01-09T07:50:50.028Z",
      "obs": {
         "configurationId": "UKCE24DF4DB",
         "object": {
            "key": "door-motion.jpg"
         },
         "bucket": {
            "urn": "obs:motion-images"
         },
         "metadata": {
            "x-house-number": "20 middlefield street"
         }
      },
 ] }
```

*FIG. 4B*

Specification 406

```
{
  "event-defs":
   "DMS-event": {
    "correlation-token":
$.messages.body.attributes.travel-request-id
   }
}
```

DMS Event Data 406A

```
{
 "queueID": "39907254-5321-4b90-bad2",
 "region": "cn-north-1",
 "messages": [
   {
     "body": "message contents",
     "attributes": {
        "subject": "Travel request",
        "travel-request-id": "989846",
     }
   }
 ],
 "eventType": "MessageCreated",
 "consumerGroupID": "g-06c2bff5-67db"
}
```

*FIG. 4C*

Specification 408

```
{
  "event-defs":
   "SMN-event": {
    "correlation-token":
    $.record.message.travel-request-id
   }
}
```

SMN Event Data 408A

```
{
  "record": [
    {
      "event_version": "1.0",
      "smn": {
        "topic_urn": "urn:smn:cn-north:0162:test3",
        "timestamp": "2018-01-09T07:11:40Z",
        "message_attributes": null,
        "message": {
           "travel-request-id": "989846",
           "contents": "message content",
        }
        "type": "notification",
        "message_id": "a51671f77d4a491a983",
        "subject": "Travel approval"
      },
      "event_subscription_urn":
         "urn:fss:0162c3a:function:smn-message",
      "event_source": "smn"
    }
  ]
}
```

*FIG. 4D*

EVENT TO SERVERLESS FUNCTION WORKFLOW INSTANCE MAPPING MECHANISM

CLAIM FOR PRIORITY

This application claims the benefit of priority to PCT Application Serial No. PCT/US2019/018625, filed Feb. 19, 2019, and to U.S. Provisional Application Ser. No. 62/637,211, filed Mar. 1, 2018, the entire contents of which are hereby incorporated by reference.

FIELD

The disclosure generally relates to mapping events to serverless functions, and in particular, to use of a common token embedded in event messages that may be used to map the events associated with an application to serverless functions.

BACKGROUND

Cloud computing refers to the use of dynamically scalable computing resources accessible via a network, such as the Internet. The computing resources, often referred to as a "cloud," provide one or more services to users. These services may be categorized according to service types, which may include for example, applications/software, platforms, infrastructure, virtualization, and servers and data storage. The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Serverless functions are one example of services in which individual code functions are executed in the cloud. This differs from a virtual machine (VM) service in which the compute environment consists of entire VM instances. Serverless functions alleviate the need for the user to deploy and manage physical servers on which these functions execute. In addition, users are only billed for the actual execution time of each Serverless function instance and not for idle time of the physical servers and VM instances. Another benefit is continuous scaling of function instances to address varying traffic load.

BRIEF SUMMARY

According to one aspect of the present disclosure, there is provided a method of mapping events to workflow instances by a controller in a network, comprising receiving an event message with an embedded token from an event source associated with an application, the event message corresponding to occurrence of an event triggered at the event source; receiving, from a serverless system, a workflow specification that specifies a location of the token embedded in the event message; extracting, by a processor, the token embedded in the event message using the location of the token specified in the workflow specification; and mapping, by the processor, the event to a workflow instance of the application based on the token extracted from the event message to maintain a state of a workflow of events mapped to workflow instances.

Optionally, in any of the preceding aspects, the method further comprises parsing the workflow specification and storing the location of the token embedded in the event message into storage.

Optionally, in any of the preceding aspects, the mapping further comprises creating the workflow instance; adding an entry in a table of memory including a mapping of the token extracted from the event message to the workflow instance; and sending the events associated with the token to the workflow instance associated with the token for processing.

Optionally, in any of the preceding aspects, the mapping further comprises retrieving an entry from a table in memory, the entry including a mapping of the token extracted from the event message to the workflow instance; and sending the event to the workflow instance identified in the entry using the token.

Optionally, in any of the preceding aspects, the token is different for different applications.

Optionally, in any of the preceding aspects, the workflow specification is instantiated as the workflow instance when events including the token embedded in the event message are received from the one or more event sources of the application.

Optionally, in any of the preceding aspects, the workflow specification defines an internal state machine and the events that trigger states in the internal state machine.

Optionally, in any of the preceding aspects, the token is used to associate a group of events within the same workflow instance.

According to one aspect of the present disclosure, there is provided a controller for mapping events to workflow instances in a network, comprising a non-transitory memory storage comprising instructions; and one or more processors in communication with the memory, wherein the one or more processors execute the instructions to receive an event message with an embedded token from an event source associated with an application, the event message corresponding to occurrence of an event triggered at the event source; receive a workflow specification, specifying a location of the token embedded in the event message, from a serverless system; extract the token embedded in the event message using the location of the token specified in the workflow specification; and map the event to a workflow instance of the application based on the token extracted from the event message to maintain a state of a workflow of events mapped to workflow instances.

According to one other aspect of the present disclosure, there is provided a non-transitory computer-readable medium storing computer instructions for mapping events to workflow instances by a controller in a network, that when executed by one or more processors, cause the one or more processors to perform the steps of receiving an event message with an embedded token from an event source associated with an application, the event message corresponding to occurrence of an event triggered at the event source; receiving, from a serverless system, a workflow specification that specifies a location of the token embedded in the event message; extracting, by a processor, the token embedded in the event message using the location of the token specified in the workflow specification; and mapping, by the processor, the event to a workflow instance of the application based on the token extracted from the event message to maintain a state of a workflow of events mapped to workflow instances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 4A-4D illustrates example embodiments of a token in a workflow instance mapping to a token in an event message.

DETAILED DESCRIPTION

Figure 1:
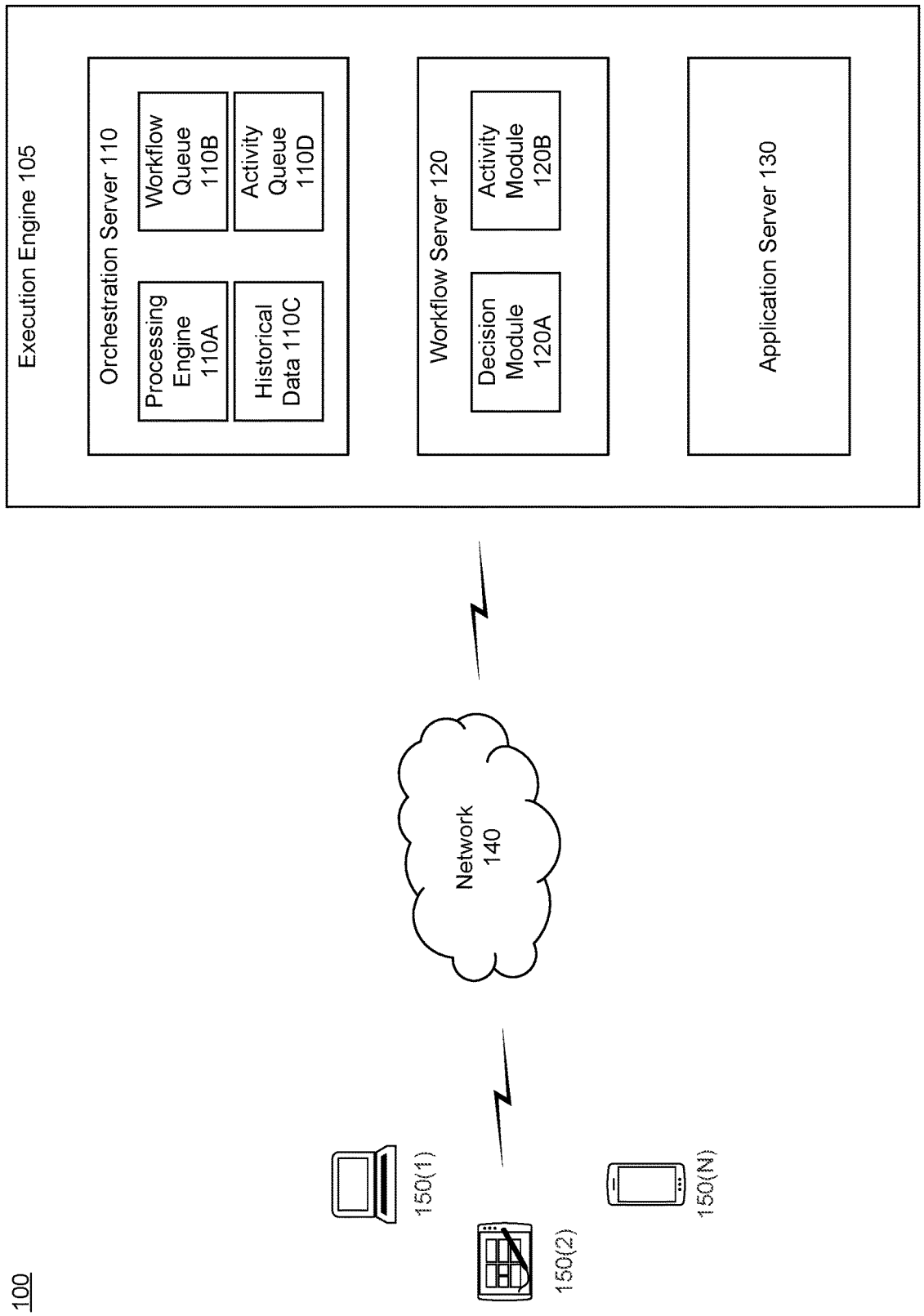
FIG. 1 illustrates an example network including an execution engine performing workflow processing.

The disclosure relates to technology for mapping events from event sources to workflow instances, and in particular, to mapping events from event sources using a token embedded in event messages that maps the events to workflow instances to process the events.

An event-driven architecture is a framework that orchestrates behavior around the production, detection and consumption of events, as well as the responses they evoke. An event may be any identifiable occurrence that has significance for system hardware or software. Typically, an event-driven architecture consists of event creators, which is the source of the event, and event consumers, which are entities that become aware of an event occurrence and often process the events.

Workflow instances (represented as function graphs) within the event-driven architecture can orchestrate serverless functions (i.e., cloud functions) to control execution of the functions for a wide variety of application use cases, such as business logic, healthcare management and the like. The workflow instances (or function graphs) can be viewed as a collection of states and the transitions and branching between these states, which may be invoked by command or triggered dynamically on arrival of an event from an event source. The function graphs also enable the coordination and sequencing of the functions to be executed, manage error conditions and handle scaling to accommodate varying event load.

An event received from an event source may be associated with a specific event state within a function graph. These event states within a function graph will wait for the arrival of events from the event source of an application before performing one or more associated actions and progressing to the next state. Accordingly, the function graphs may define states at which to wait before executing the serverless function actions and progressing through the function graph before ultimately transitioning to the next state.

In one embodiment, an event processing server or controller within the event-driven architecture allows for the instantiation and dispatch of multiple workflow instances, where each workflow instance is associated with a particular application. As events arrive at the event processing server, tokens extracted from event messages map the events to the workflow instances for processing. In one embodiment, when an extracted token cannot be associated with a workflow instance, a new workflow instance may be created and associated with the token.

As used within the context of this disclosure, a workflow (also referred to as a function workflow or application) may coordinate the execution of a single function or functions and prescribe(s) the sequencing of individual functions (when more than one function) required for operation of an event-driven application. The workflow may also determine which event or combination of events trigger which function or combination of functions.

In one embodiment, each workflow may be associated with multiple events from a single event source. In another embodiment, each workflow may be associated with different types of event sources.

Each workflow, as will be described below, may have various states that coordinate events and functions to be invoked. In one embodiment, a workflow may defined by, but is not limited to, a workflow specification which specifies the behavior, the events and the functions associated with it, the interaction between the events and the functions, the workflow steps, interaction between the events and the steps, and the transition between the steps.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example network including an execution engine performing workflow processing. The network 100 includes an execution engine 105 that operates in a distributed computing environment and includes several computer systems that may be interconnected using, for example, one or more computer networks (not shown). The execution engine 105 includes an orchestration server 110, a processing server 120 and an application server 130, which together are connectable to one or more end user devices 150(1)-(N) via network 140. In one embodiment, the functional components executed in the servers 110, 120 and 130 can be executed within a single server or a pool of servers.

The orchestration server 110 includes a processing engine 110A, workflow queue(s) 110B, historical data 110C and activity queue(s) 110D. The processing engine 110A can be executed to orchestrate the execution of various workflow instances. Implementation of a workflow instance can involve placement of a workflow, or data related to a workflow, in the workflow queue 110B. Each workflow queue 11B may correspond to a different type of workflow, a different workflow server 120, a combination thereof, or any other logical separation of queued workflows, including those determined by load balancing techniques, etc.

The processing engine 110A can be a computer executable program or collection of programs. In one embodiment, the processing engine 110A is associated with historical data 110C to assist in orchestration. The historical data 110C may include, for example, a list of events that have occurred during the implementation of a given workflow instance over time. The events listed can include activities executed on behalf of the workflow instance, such as the scheduling of an activity, the execution of an activity, the completion of an activity, the starting or stopping of a timer, etc. The historical data 110C can be stored, for example, in an electronic data store, such as a memory, database, hard disk, etc.

The components implemented on the workflow server 120 can include, but are not limited to, a decision module 120A and an activity module 120B. Workflow definitions may be embodied in functional code in the decision modules 120A and can be configured to identify the activities, actions, or steps to be performed for a specific workflow instance based upon the functional expression of a workflow definition. For example, each decision module 120A can embody a workflow definition in the form of functional logic as may be expressed, for example, in terms of programmed code, such as Java™ or C++.

An activity module 120B can be executed to perform one or more actions, tasks, or functions that include at least a portion of a workflow instance based upon a command from a decision module 120A. In one embodiment, the activity module 120B can be implemented as Java™ classes that are each instantiated multiple times in order to handle the workflow processing load from the decision modules 120A. In one other embodiment, an activity queue 120B (on the orchestration server 110) can be associated with each type or class of activity module 120B. In response to a decision module 120A issuing a command to execute an activity module 120B, the processing engine 110A can place the command in the activity queue 110D to be executed by the corresponding activity module 120B.

The network 140 can be any wired network, wireless network or combination thereof. In addition, the network 140 can be a personal area network, local area network, wide area network, cable network, satellite network, cellular telephone network, the Internet, etc., or any combination thereof. Each of the workflow orchestration server 110, workflow processing server 120 and application server 130 can be a physical computing device configured to execute software applications. In some embodiments, the servers 110, 120, 130 can be configured to execute one or more software applications on the same single physical or virtual device, across multiple physical/virtual devices, or any combination thereof.

The end-user devices 150(1)-(N) can communicate with the various components of the execution engine 105 over the network 140. The end-user devices 150(1)-(N) include, for example a laptop, personal computer, personal digital assistant (PDA), hybrid PDA/mobile phone, mobile phone, electronic book reader, digital media player, tablet, head mounted display devices, and the like. It is appreciated that the end-user devices are not limited to those depicted and can be any of a number of computing devices that are capable of communicating over a network.

In operation, the orchestration server 110 can receive notification of an event from the application server 130 or an end-user device 150(1)-(N). In response, the orchestration server 110 loads a new instance of a workflow into the workflow queue 110B. In some embodiments, the specific workflow instantiated in response to the event can be based on the event, with various events associated with different workflows, etc. In one embodiment, the workflow server 120 can be configured to poll the workflow orchestration server 110 for queued workflows to process, and can receive information about queued workflows that the workflow server 120 is configured to process.

Processing a workflow can involve determining which activity or activities to execute or schedule for execution based on the current event. Each time the workflow processing server 120 processes an activity, it can generate a command, raise an error, or otherwise initiate a notification to the workflow orchestration server 110, which the workflow orchestration server 110 can save as historical data 110C. In some embodiments, the command can be an instruction to execute a program or routine, to start or stop a timer, to send a message to another component or an external process, etc. In one embodiment, the workflow process can then be queued for further processing.

Figure 2:
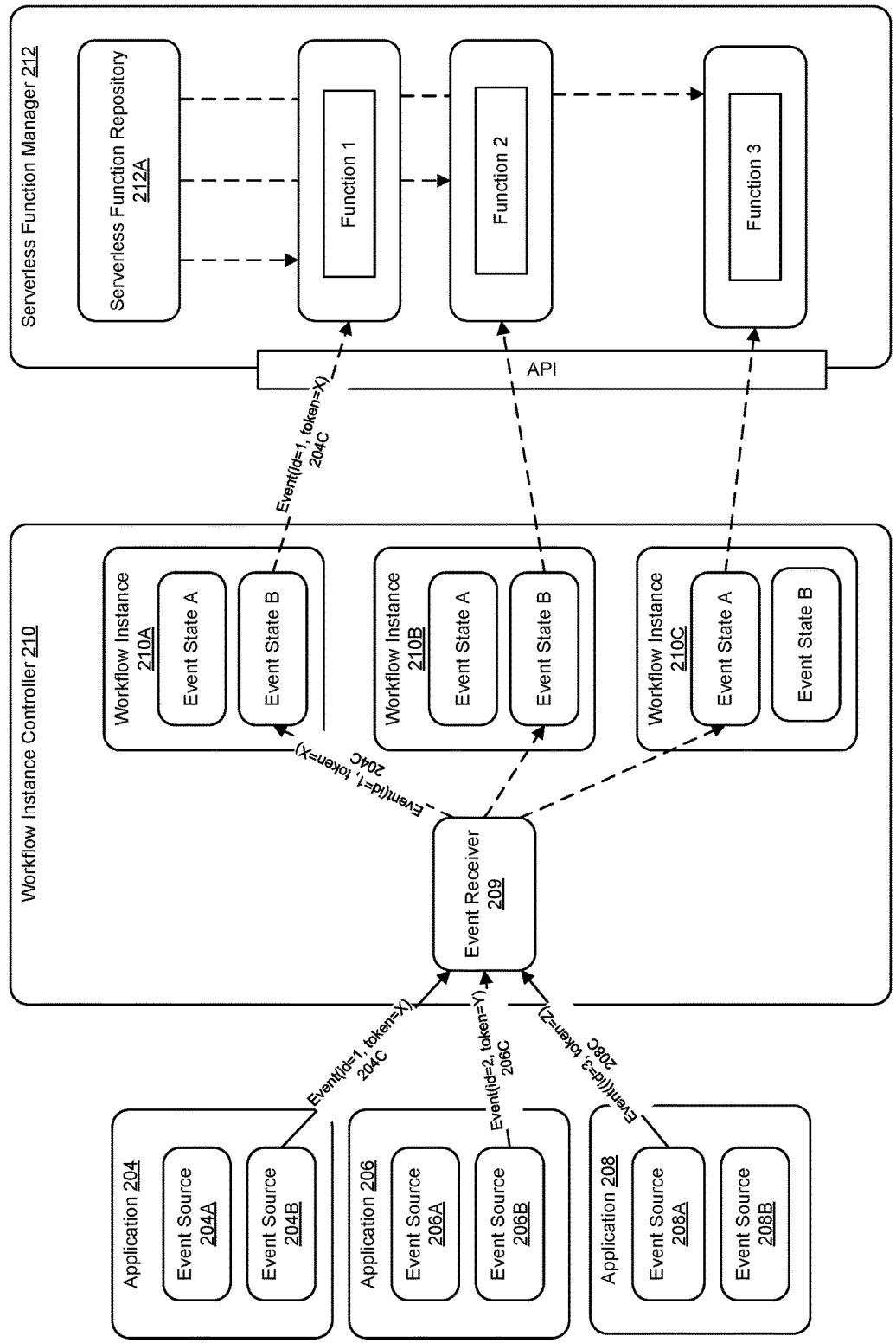
FIG. 2 illustrates an example event-driven orchestration system.

FIG. 2 illustrates an example event-driven orchestration system. Event-driven orchestration system 200 may include one or more applications 204, 206, 208, a Workflow Instance Controller (WIC) 210 that is configured to provide an environment for processing events and a serverless function manager 212 that processes the events received at the WIC 210.

In the depicted embodiment, each application 204, 206 and 208 (e.g., an event-driven application) has a group of events sources. For example, application 204 has two event sources 204A and 204B, which together form group 204A/204B; application 206 has two event sources 206A and 206B, which together form group 206A/206B; and application 208 has two event sources 208A and 208B, which together form group 208A/208B. Each group of event sources may generate one or more events to be received by WIC 210. For example, as depicted in FIG. 2, an event receiver 209 (described below) in WIC 210 may receive the one or more events from the event sources 204B, 206B and 208A.

In one embodiment, when an event occurs, the WIC 210 is notified by the application 204 using an event message 204C, 206C or 208C. In one embodiment, the event message may comprise an event identifier (e.g., id=1) and a token (e.g., token=x). For example, an event message "Event (id=1, token=X)" 204C is sent from event source 204B of application 204 to the event receiver 209 of WIC 210. In one other embodiment, the token is embedded in the event message and is common to each of the event sources (e.g., event sources 204A and 204B) associated with the same application (e.g., application 204). In this embodiment, any event message 204C sent by the event sources 204A and 204B will include the same (i.e., common) token (e.g., token=x).

One or more workflow instances 210A, 210B and 210C may be deployed on and executed by WIC 210. As event messages 204C, 206C and 208C are received by the event receiver 209, the workflow instances 210A, 210B and 210C are instantiated to accommodate the traffic (e.g., event messages) from the event sources 204A, 204B . . . 208A and 208B. In one embodiment, the event receiver 209 maps each event to a corresponding workflow instance 210A, 210B and 210C. In a further embodiment, each of the workflow instances 210A, 210B and 210C may be associated with one or more different types of event sources 204A, 204B . . . 208A and 208B, and each event source 204A, 204B . . . 208A and 208B is associated with a single workflow instance 210A, 210B or 210C.

In one other embodiment, different workflow instances 210A, 210B and 210C may have different event types, different event sources, and different event formats.

The workflow instances 210A, 210B and 210C may be implemented as a state machine which invoke cloud services or functions. State machines may be represented as a function or service graph, where each function graph includes, for example, states, events, actions and action results. For example, states may have various and different behaviors, such as a delay state, a switch state, an event state, an operation state and a NoOp state. In one embodiment, the delay state may cause the function graph execution to wait for a specified duration, the switch state may permit transitions to multiple other states based on the contents of the payload, the operation state may allow the execution of one or more serverless functions and specifies a list of actions to be executed. Additionally, the event state may allow for handling of events from different event sources and specifies a list of event-expression structures that are used to match incoming events.

For each workflow instance 210A, 210B and 210C, event states A and B include a list of one or more actions (not shown) which may be executed, where each action performs the execution of a serverless function. For each action, there is a list of action results that handle the result of the action, such as retry handling, next state transitions and function graph termination. In one embodiment, a workflow instance (represented as a function graph) is defined in JAVASCRIPT™ Objection Notation (BON), although it is not limited to such a language. Other languages, such as YAML, XML and the like may also be employed.

In one embodiment, WIC 210 processes the workflow instances 210A, 210B and 210C to invoke a serverless function (e.g., function 1, function 2 or function 3) associated with a particular action of an event state A or B. For example, in the case of an event message 204C sent by event source 204B, the event message ("event(id=1, token=X") 204C is received at the WIC 210 and directed by the event receiver 209 to forward the payload associated with the event message 204C to event state B of workflow instance 210A. At event state B, an action (not shown) is processed by the WIC 210 which in turn invokes a serverless function (e.g., function 1) in the serverless function manager 212. Mapping an event to a workflow instance is described below in more detail with reference to the various figures.

In one embodiment, the functions (e.g., functions 1, functions 2 and functions 3) may be stored in serverless function repository 212A and deployed in separate containers for isolation and modularity, while also providing enhanced quality and reliability with integrated testing, logging, monitoring, and diagnostic strategies.

Each function will be understood to include a software application (e.g., service) that is comprised of a plurality of independently deployable services. These functions represent serverless functions that may also be broken down into smaller services (microservices) organized, for example, around business capability (e.g., API engine, REST interfaces, socket connection, monitoring, and notifications).

It should be appreciated that event-driven orchestration system 200 depicted in FIG. 2 may have other components than those illustrated and that the disclosed embodiments are non-limiting. Further, the embodiment shown in FIG. 2 is only one example of a system that may incorporate an embodiment of the present disclosure. In some other embodiments, event-driven orchestration system 200 may have more or fewer components than shown in FIG. 2, may combine two or more components, or may have a different configuration or arrangement of components.

For example, although WIC 210 is illustrated as receiving three events from three separate event sources 204B, 206B and 208A, this is not intended to be limiting. In alternative embodiments, a WIC 210 may be configured to receive to any number of events from any number of event sources, map the events from the event sources to event states in the workflow instance and output the selected events to a serverless function manager 212 to invoke serverless functions associated with the events. Moreover, any number of workflow instances (e.g. in the form of event state machines) may be employed, which includes any number of states and actions.

It is also appreciated that event-driven orchestration system 200 can be of various types including a personal computer, a portable device (e.g., a mobile telephone or device), a workstation, a network computer, a mainframe, a kiosk, a server, or any other data processing system or combination thereof.

In other embodiments, event-driven orchestration system 200 may be configured as a distributed system where one or more components of event-driven orchestration system 200 are distributed across one or more networks in the cloud. The components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3:
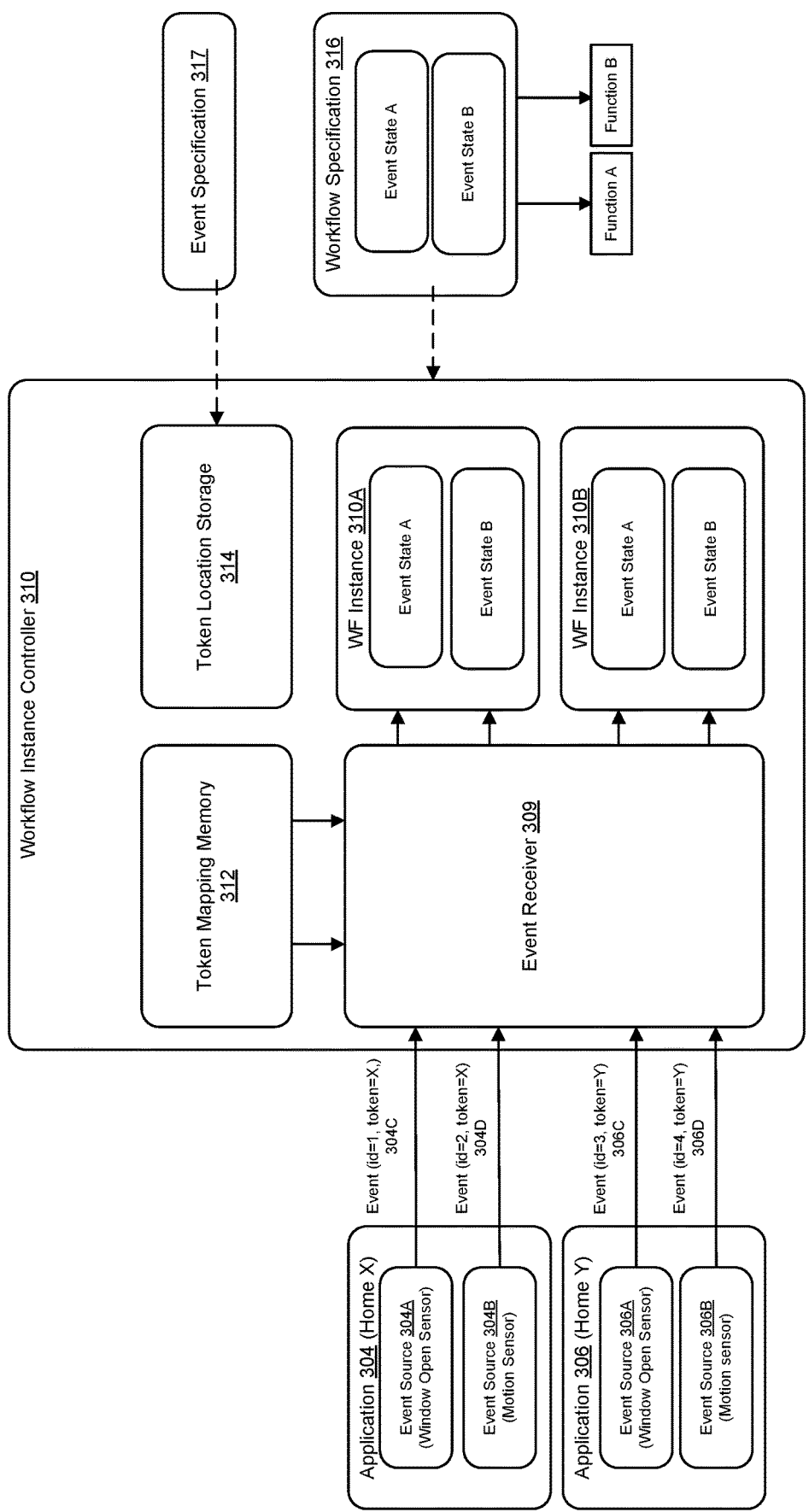
FIG. 3 illustrates an example implementation of the event-driven orchestration system of FIG. 2.

FIG. 3 illustrates an example implementation of the event-driven orchestration system of FIG. 2. In the embodiments described below, the WIC 310 is responsible for receiving events and mapping the events to workflow instances. However, it is appreciated that implementation of the described procedures are not limited to the WIC 310, and that any component or combination of components described in the various figures may be responsible for the operational procedures.

The example event-driven orchestration system 300 includes two applications 304 and 306, a Workflow Instance Controller (WIC) 310 that is configured to provide an environment for processing events from the applications, a workflow specification 316 that defines workflow instances for a corresponding application, and an event specification 317 that defines the location of a token in an event message 304C, 304D, 306C and 306D.

In one embodiment, the workflow specification 316 may be formed as a function workflow template that defines the functional flow of a workflow instance. For example, workflow specification 316 is defined as having two event states—event state A and event state B, in which two functions—function A and function B, are respectively output. The event specification 317 may be designed as a template in a similar manner. In one embodiment, the workflow specification 316 and the event specification 317 may be formed together as a single specification or a combination of specifications.

In the illustrated example, and for purposes of discussion, the event-driven orchestration system 300 depicts a workflow implementation of two home security systems for a home X and a home Y, where each home security application 304 and 306 include various event sources (e.g., window open sensor or motion sensor) located in the home security systems to detect events (e.g., a window opening or movement in the home) when they occur. In this case, the workflow specification 316 may define an event state for a window open sensor and an event state for a motion sensor. As event messages 304C, 304D, 306C and 306D are received at WIC 310 from respective applications 304 and 306, the workflow specification 316 may be instantiated as two workflow instances 310A and 310B. In one embodiment, and as shown, the event messages 304C, 304D, 306C and 306D each contain an embedded token X or Y that allows the event receiver 309 to map the incoming event messages 304C, 304D, 306C and 306D to a specific workflow instance 310A and 310B.

In the disclosed example, each application 304 and 306 includes two event sources (together forming a group of event sources)—group of event sources 304A and 304B and group of event sources 306A and 306B. The event sources 304C, 304D, 306C and 306D, as explained, are responsible for detecting and transmitting event information. For example, event sources 304A and 306A comprise a "window open" sensor to detect a window opening and event sources 304B and 306B comprise a "motion" sensor to detect movement. Accordingly, each group of event sources may sense two different types of events using two different types sensors—a window open event and a motion event. However, it is appreciated that the disclosure is not limited to a window opening sensor and a motion sensor, and that any number of devices or sensors may be positioned or grouped within an application to capture and/or detect events.

WIC 310, similar to WIC 210 in FIG. 2, is configured to provide an environment for processing events sent from the applications 304 and 306. The WIC 310 includes an event receiver 309, WF instance 310A, WF instance 310B, token mapping memory 312 and token location storage 314. The event receiver 309 is tasked with receiving event messages 304C, 304D, 306C and 306D transmitted from respective event sources 304A, 304B, 306A and 306B and mapping the received event messages 304C, 304D, 306C and 306D to a respective one of the workflow instances 310A and 310B. It is appreciated that although a single WIC 316 is depicted, any number of workflow instances may be created and employed in the event-driven orchestration system 300.

Mapping is performed, as explained below, by the event receiver 309 accessing the token mapping memory 312 and the token location storage 314 so as to extract tokens X and Y embedded in the received event messages 304C, 304D, 306C and 306D. The extracted tokens X and Y may then be used to correlate the event messages to a specific workflow instance 310A or 310B. In one embodiment, the token is used to associate a group of event sources for correlation to the same workflow instance. For example, a first group of event sources 304A and 304B produce event messages 304C and 304D with the same token (e.g., token=X) and are correlated to the same workflow instance (e.g., workflow instance 310A). Likewise, a second group of event sources 306A and 306B produce event messages 306C and 306D with the same token (e.g., token=Y) and are correlated to the same workflow instance (e.g., workflow instance 310B).

Token mapping memory 312 may be any type memory or storage, such as cache, that stores a table of entries for mapping tokens to corresponding workflow instances. For example, token mapping memory 312 may contain a table with a first entry identifying "token=X" as corresponding to workflow instance 310A and a second entry identifying "token=Y" as corresponding to workflow instance 310B.

Accordingly, when an event message 304C, 304D, 306C and 306D is received at event receiver 309, the event receiver 309 may extract the embedded token and reference the token mapping memory 312 to instantiate the specific workflow instance identified in the entry.

Token location storage 314 may be any type or memory or storage, such as a data structure, that may store the location of tokens for different types of events. When a workflow specification 316 is sent to the WIC 310, the event specification 317 and/or the workflow specification 316 is parsed and the location of the token is stored in the token storage location 314. For example, an event message may be distributed messaging service (DMS) event data where the token in the event message is identifiable by a JSON path specified in the event specification 317 and/or the workflow specification 316 for a DMS-type event. Accordingly, when an event message 304C, 304D, 306C and 306D arrives at the event receiver 309, the event receiver 309 may reference the token location storage 314 to determine the location of the embedded token for extraction. Storage location and extraction of a token is explained in more detailed below with reference to FIGS. 4A-4D.

Figure 7:
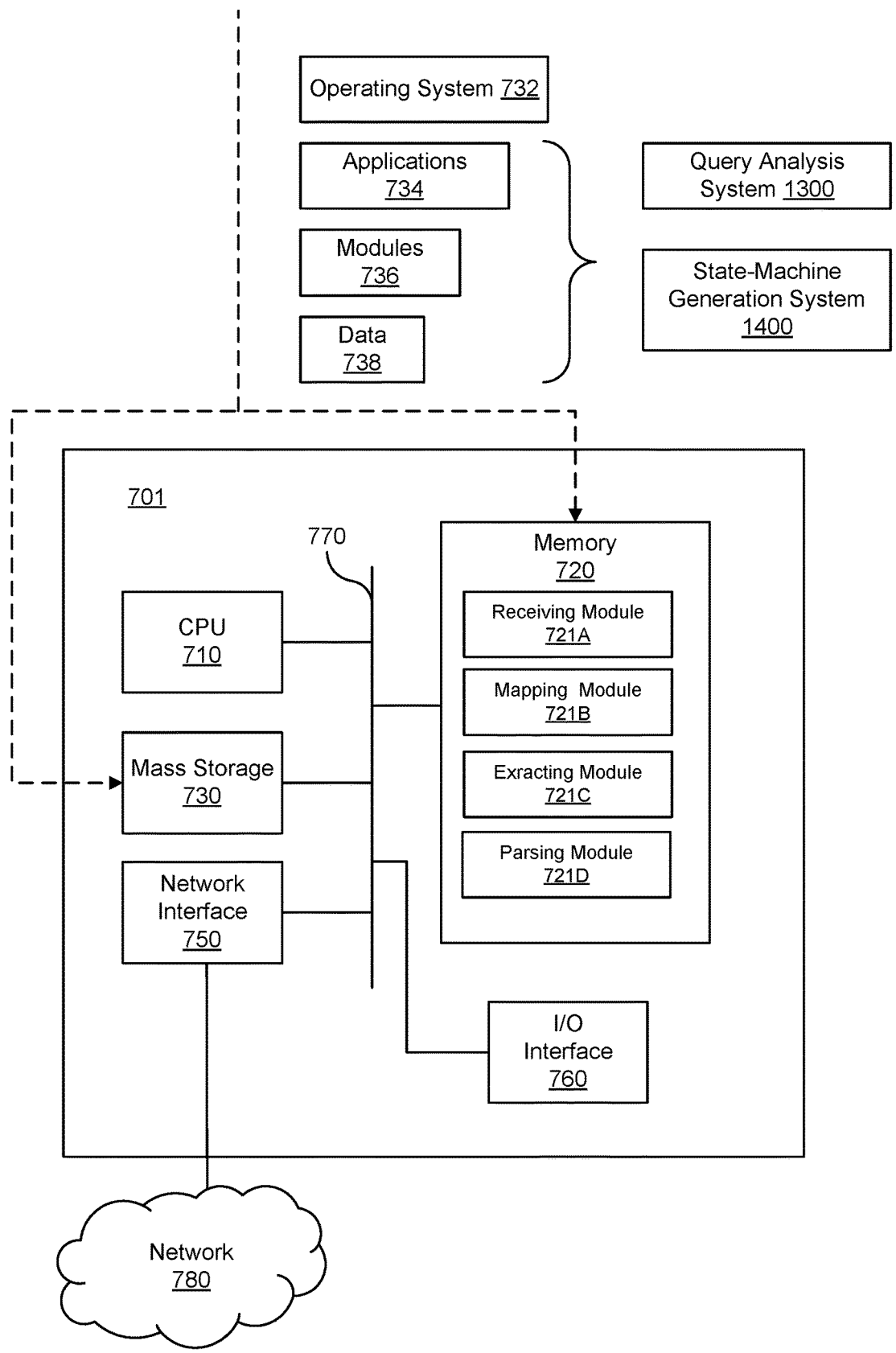
FIG. 7 is a block diagram of a network device that can be used to implement various embodiments.

In one embodiment, the event specification 317 and/or workflow specification 316 may be created by operators and developers in order to define workflow functions for a particular workflow instance (described further below). In one other embodiment, the event specification 317 and/or workflow specification 316 may be generated by a processing engine, such as processing engine 110A or state machine generation system 1400 (FIG. 7), using information acquired by the execution engine 105 and/or query analysis system 1300 (FIG. 7). This provides the event-driven orchestration system 300 with the ability to automate the creation of event specifications 317 and/or workflow specifications 316, which would otherwise be manually input.

As illustrated, the workflow specification 316 may be implemented as a state machine which invokes cloud services or functions (e.g., function A and function B). The state machine may be represented as a function or a service graph, where each function graph includes, for example, states, events, actions and action results. As defined in the example workflow specification 316, when events (such as events A and B) arrive for processing at the WIC 310, they are sent to an event state A or B such that an associated action may be performed which in turn invokes one of serverless functions A and B.

In one embodiment, the event specification 317 or the workflow specification 316 also specifies a location of the token that is embedded in an event message by the event source(s). The location of the token may then be stored in the token location storage 314 for later retrieval.

As described, workflow instances 310A and 310B may be instantiated upon receipt of events from the event sources 304A, 304B, 306A and 306B. In one embodiment, an event message includes an event ID (identifying the specific event, such as a window opening or detected motion) and an embedded token (specifying the workflow instance corresponding to the event sources in the particular application). As event messages 304C, 304D, 306C and 306D are received by the event receiver 309, the embedded token (e.g., token X or Y) is extracted from the event message and is used to instantiate a workflow instance 310A or 310B.

For example, an event message of "Event(id=1, token=X)" is sent from event source 304A when a window open event is detected and an event message of "Event(id=2, token=X)" is sent from event source 304B when a motion event is detected. Similarly, an event message of "Event (id=3, token=Y)" is sent from event source 306A when a window open event is detected and an event message of "Event(id=2, token=X)" is sent from event source 306B when a motion event is detected. As appreciated, each "event" is identified by the "id" and each application has a corresponding token X or Y used to map the events to a specific workflow instance 310A or 310B.

Upon receipt, the event receiver 309 extracts the embedded token (e.g., token=X or token=Y) from the event message 304C, 304D, 306C and 306D using the location information stored in the token location storage 314. Subsequently, the event receiver 309 accesses the token mapping memory 312, which contains a table of entries that map the extracted token to specific workflow instances 310A and 310B. For example, token mapping memory 312 may contain a table with a first entry identifying "token=X" as corresponding to workflow instance 310A and a second entry identifying "token=Y" as corresponding to workflow instance 310B. When an event message with "token=X" is received by the event receiver 309, the workflow instance 310A is instantiated for processing the event received in the corresponding event message 304C, 304D, 306C and 306D. Similarly, when an event message with "token=Y" is received by the event receiver 309, the workflow instance 3106 is instantiated for processing the event received in the corresponding event message 304C, 304D, 306C and 306D. It is also appreciated that other mechanisms may be employed to map the extracted tokens to workflow instances, and the disclosure is not limited to the described embodiment.

In one embodiment, if an extracted token X or Y from a corresponding event message 304C, 304D, 306C and 306D does not have a mapping entry in the table of token mapping memory 312, the event receiver 309 adds an entry into the table of the token mapping memory 312 that maps the token to the newly created workflow instance. The new workflow instance is then instantiated to process the event received in the event message 304C, 304D, 306C and 306D.

In one other embodiment, the workflow instances 310A and 3106 may be instantiated by the operator as opposed to being automatically instantiating. In this case, the operator may start each workflow instance 310A and 3106 from the workflow specification 316 with a unique token for each application 304 and 306. The event sources 304A, 304B, 306A and 306B for a specific application 304 and 306 may be assigned a workflow instance 310A and 310B. A token may be sent to each event source 304A, 304B, 306A and 306B, and the token mapping memory 312 may be prepopulated with token-to-workflow instance mapping entries. As event messages 304C, 304D, 306C and 306D are sent from an event source 304A, 304B, 306A and 306B, a token assigned by the operator may be embedded into the event message 304C, 304D, 306C and 306D. Upon receipt by the event receiver 309, the token mapping memory 312 is accessed to look up the mapping entry in the table for the workflow instance corresponding to the embedded token, and the workflow instance processes the received event message 304C, 304D, 306C and 306D.

FIGS. 4A-4D illustrate example embodiments of a token in an event message mapped to a workflow instance. Tokens embedded in the event messages may be used to map events detected by an event resource to associated workflow instances.

To extract an embedded token from an event message upon receipt by the event receiver 309, the location of an embedded token in the event message is specified in the event specification 317 or workflow specification 316. As explained above, the event specification 317 or workflow specification 316 provide a template for each workflow instance. In one embodiment, a JSON path may be used to identify the token, such as:

```
{"event-defs":
    "<Event Name>" : {
        "correlation-token": $path
    }
}
```

Within the context of the event specification 317 or workflow specification 316, the token (or "correlation-token") can be any string that uniquely identifies an application event instance. For example, the "event name" string may be defined as a DMS event, a simple message notification (SMN) event, an API Gateway event, an Object Storage Service (OBS) storage event, or the like.

The token may be embedded in different "field" locations of the event messages for different events. For example, the event message may be a JSON event payload in which the location of the token in the event message is specified by a JSON path ("$path"). In one embodiment, the JSON path location may be defined as "$.record.tag-ID" in the event specification 317 or workflow specification 316 using a parameter: "correlation-token-path": <JSON path to correlation token>.

By referencing the aforementioned token mapping memory 312 and the token location storage 314, the event receiver 309 may be configured with the "correlation-token-path" (as defined in a corresponding workflow instance) and use the JSON path location to extract a token from the received event messages.

In a specific example, and with reference to FIG. 4A, the "correlation-token" path of the event specification and/or workflow specification 402 specifies the location of the token in a HTTP API Gateway event as:

```
{
    "event-defs":
        "HTTP-event": {
            "correlation-token ": "$.headers.body.x-house-number"
        }
}
```

The defined JSON path ("$.headers.body.x-house-number") can be retrieved from the token location storage 314 and used to extract the correlation token from the HTTP API Gateway event data 402A. In this example, extraction of the token identifies the application (x-house-number) as "20 middlefield street."

In the example of FIG. 4B, the "correlation-token" path of the event specification or workflow specification 404 specifies the location of the token in an OBS event as:

```
{
    "event-defs":
        "OBS-event": {
            "correlation-token ": "$.Records[0].obs.metadata.x-house.number"
        }
}
```

The defined JSON path ("$.Records[0].obs.metadata.x-house.number") can be retrieved from the token location storage 314 and used to extract the correlation token from the OBS event data 404A. Similar to the above-example, extraction of the token identifies the application (x-house-number) as "20 middlefield street."

Turning to FIG. 4C, the "correlation-token" path of the event specification or workflow specification 406 specifies the location of the token in a DMS event as:

```
{
  "event-defs":
    "DMS-event": {
      "correlation-token ": "$.message.body.attributes.travel-request-id"
    }
}
```

The defined JSON path ("$.message.body.attributes.travel-request-id") can be retrieved from the token location storage 314 and used to extract the correlation token from the DMS event data 406A. In this example, extraction of the token identifies the application (travel-request-id) as "989846."

In one other example, with reference to FIG. 4D, the "correlation-token" path of the event specification or workflow specification 408 specifies the location of the token in an SMN event as:

```
{
  "event-defs":
    "SMN-event": {
      "correlation-token ": "$.record.message.travel-request-id"
    }
}
```

The defined JSON path ("$.record.message.travel-request-id") can be retrieved from the token location storage 314 and used to extract the correlation token from the DMS event data 408A. In this example, extraction of the token identifies the application (travel-request-id) as "989846."

Figure 5:
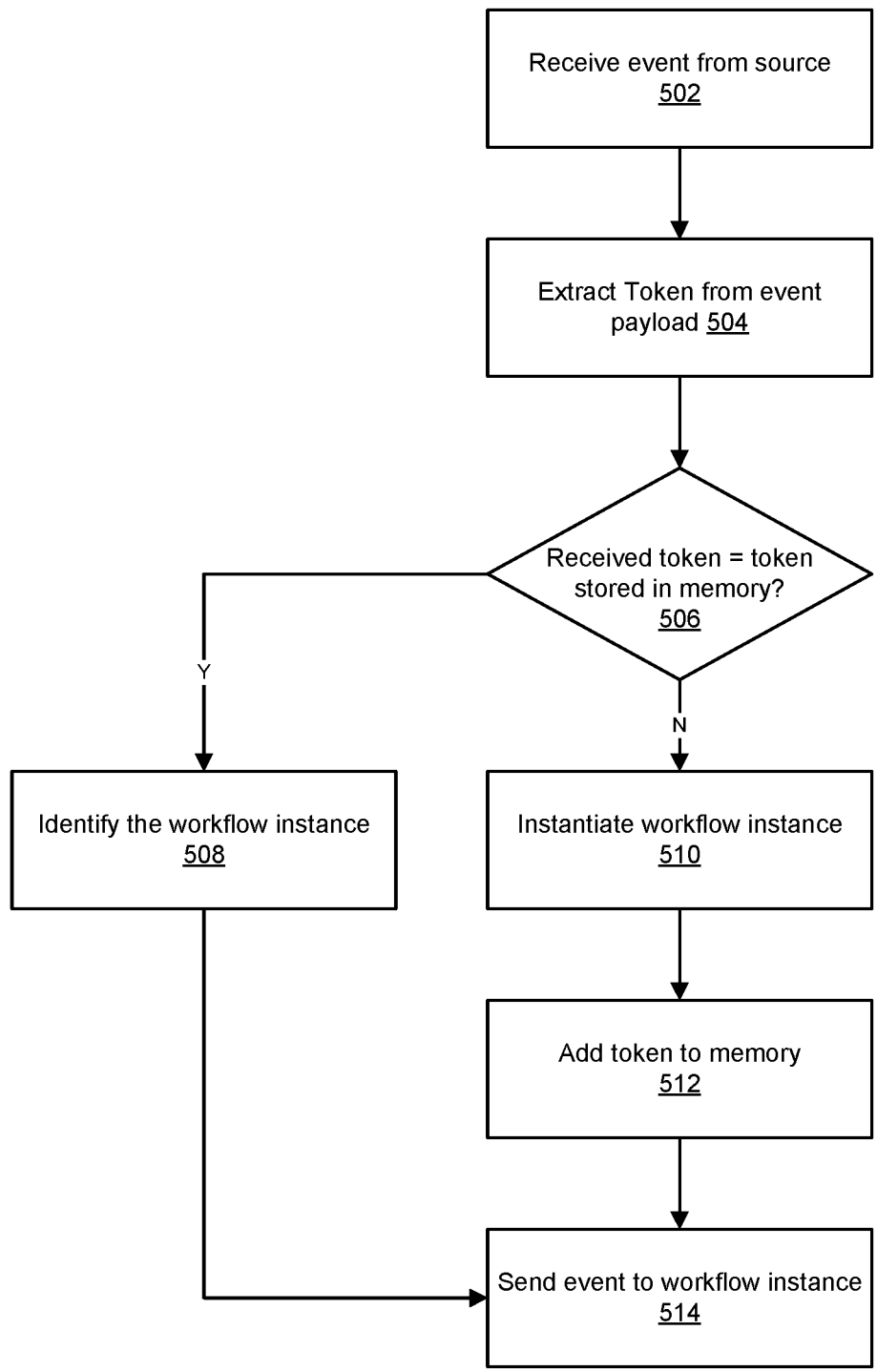
FIG. 5 illustrates a flow diagram of mapping an event to a workflow instance in accordance with the disclosed embodiments.

FIG. 5 illustrates a flow diagram of mapping an event to a workflow instance in accordance with the disclosed embodiments. The procedures described in the diagram are implemented by the event receiver 309 of the workflow instance controller 310 for purposes of discussion, and may include software and/or hardware components. However, it is appreciated that any system component or combination of components may implement the procedures.

At 502, the event receiver 309 receives an event message 304C, 304D, 306C or 306D from an event source 304A, 304B, 306A or 306B. In one embodiment, the event message 304C, 304D, 306C or 306D includes an embedded token from one or more event sources 304A, 304B, 306A or 306B associated with an application 304 or 306.

At 504, the event receiver 309 locates and extracts the embedded token from the event message 304C, 304D, 306C or 306D by accessing the token location in the token location storage 314.

The event receiver 309 accesses the token mapping memory 312 to retrieve token mapping entries at 506. Upon accessing the token mapping memory 312, if an entry exists for the token in a table of the token mapping memory 312, the event receiver 309 identifies the entry corresponding to the token at 508 and retrieves the entry mapping the token to a workflow instance 310A or 3106. The event is then sent to the specified workflow instance as identified in the entry for processing at 514.

If an entry does not exist for the token in a table when accessing the mapping memory 312, the event receiver 309 begins a new workflow instance at 510, adds a new entry in the table of the token mapping memory 312 that correlates the token with the new workflow instance at 512, and sends the event to the new workflow instance at 514. In one embodiment, this is performed automatically by the event receiver 309. In another embodiment, the new workflow instance may be manually created.

Figure 6:
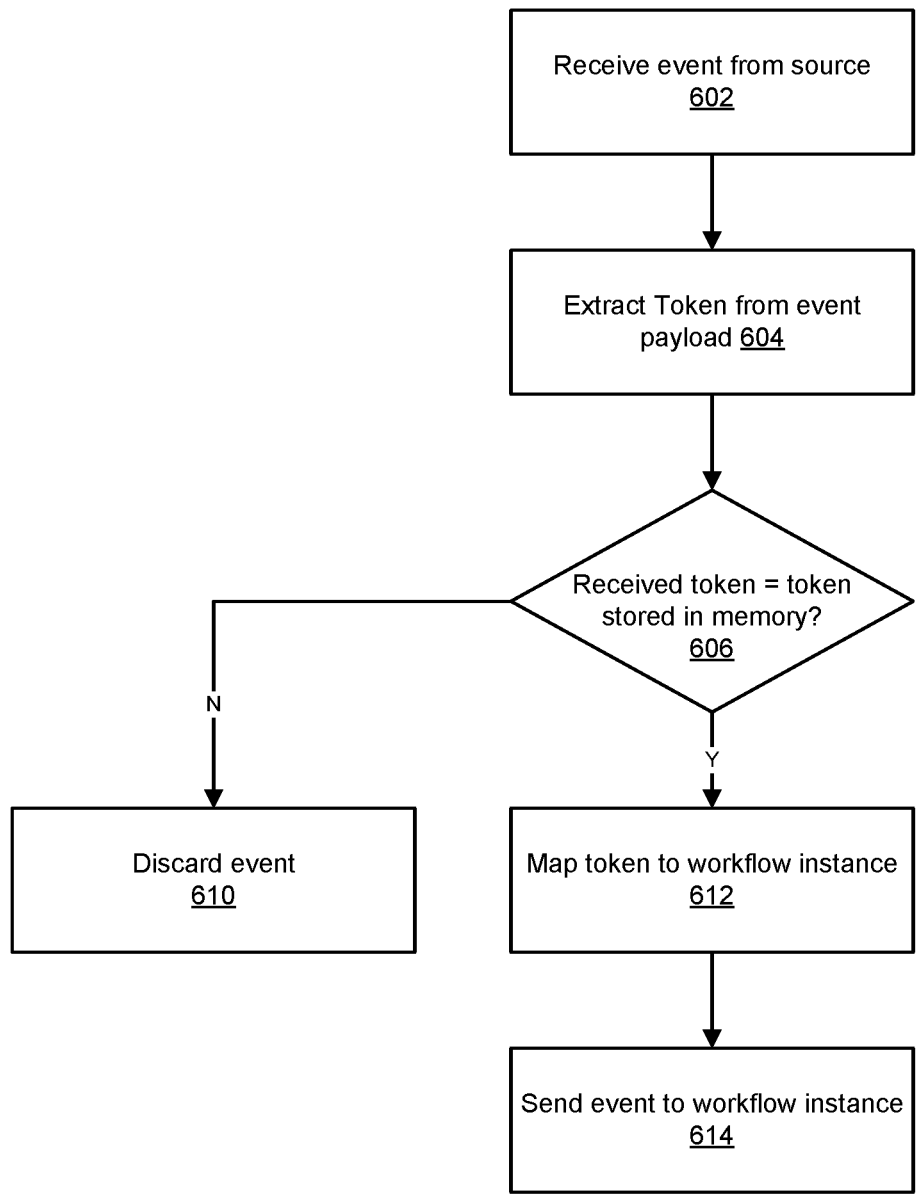
FIG. 6 illustrates another flow diagram of mapping an event to a workflow instance in accordance with the disclosed embodiments.

FIG. 6 illustrates another example flow diagram of mapping an event to a workflow instance in accordance with the disclosed embodiments. The procedures described in the diagram are implemented by the event receiver of the workflow instance controller for purposes of discussion, and may include software and/or hardware components. However, it is appreciated that any system component or combination of components may implement the procedures.

At 602, the event receiver 309 receives an event message 304C, 304D, 306C or 306D from an event source 304A, 304B, 306A or 306B. In one embodiment, the event message 304C, 304D, 306C or 306D includes an embedded token from one or more event sources 304A, 304B, 306A or 306B associated with an application 304 or 306.

At 604, the event receiver 309 locates and extracts the embedded token from the event message 304C, 304D, 306C or 306D by accessing the token location in the token location storage 314.

The event receiver 309 accesses the token mapping memory 312 to retrieve token mapping entries at 606. Upon accessing the token mapping memory 312, if an entry does not exist for the token in a table of the token mapping memory 312, the event receiver 309 discards the event at 610.

If an entry exists for the token in a table when accessing the token mapping memory 312, the event receiver 309 retrieves the entry mapping the token to a workflow instance at 612, and the event is sent to the specified workflow instance 310A or 3106 as identified in the entry for processing at 614.

FIG. 7 is a block diagram of a network device that can be used to implement various embodiments. Specific network devices may utilize all of the components shown, or only a subset of the components, and levels of integration may vary from device to device. Furthermore, the network device may contain multiple instances of a component, such as multiple processing units, processors, memories, transmitters, receivers, etc. The network device may comprise a processing unit 701 equipped with one or more input/output devices, such as network interfaces, storage interfaces, and the like. The processing unit 701 may include a central processing unit (CPU) 710, a memory 720, a mass storage device 730, and an I/O interface 760 connected to a bus 770. The bus 770 may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. In one embodiment, the memory 720 includes a receiving module 721A receiving one or more event messages with an embedded token from one or more event sources (such as an HTTP gateway, storage, messaging or queuing services) associated with an application and receiving an event specification and/or workflow specification that specifies a location of the embedded token in the one or more event messages, the one or more events including an event request, a extracting module 721B extracting the token embedded in the one or more event messages using the location of the token specified in the event specification and/or workflow specification, a mapping module 721C mapping the events to a workflow instance of the application based on the extracted token in the one or more event messages and a parsing module 721D comprising parsing the event specification and/or workflow specification and storing the location of the embedded token in the one or more event messages into storage.

The mass storage device 730 may comprise any type of storage device configured to store data, programs, and other information and to make the data, programs, and other information accessible via the bus 770. The mass storage device 730 may comprise, for example, one or more of a solid state drive, hard disk drive, a magnetic disk drive, an optical disk drive, or the like.

Memory 720 and mass storage device 730 can include, or have stored therein, operating system 732, one or more applications 734, one or more program modules 736 and data 738. The operating system 732 acts to control and allocate resources of the processing unit 701. Applications 734 include one or both of system and application software and can exploit management of resources by the operating system 732 through program modules 736 and data 738 stored in memory 720 and/or mass storage device 730 to perform one or more actions. Accordingly, applications 734 can turn a general-purpose computer into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, a query analysis system 1300 and a state-machine generation system 1400 can be or form part of part of the application 734, include one or more modules 736 and data 738 stored in memory and/or mass storage 730 whose functionality can be realized when executed by one or more processor(s)/CPU(s) 710.

The query analysis system 1300 includes a validation component (not shown) that is configured to receive, retrieve, or otherwise obtain or acquire a query. For example, the query can correspond to a language-integrated query, amongst other types of queries. The validation component checks or validates the query as a function of a state machine component (also referred to as a state machine, such as workflow instances 210A, 210B and 210C in the form of state machines in FIG. 2), which captures constraints of a target query language including but not limited to supported query operators and patterns of query operators (e.g., limits on the number of occurrences of query operators and relative ordering of query operators), for example. In one embodiment, the state machine component can be a type-based state machine that captures constraints as types and methods as discussed below. If the query does not meet the constraints of a target query language, for example, if an invalid query operator or invalid pattern of query operators is detected, the validation component can signal an error. In one other embodiment, the validation component can perform compile-time checking of the query thus mitigating the risk of runtime failure. Accordingly, the validation component can form part of a program language compiler.

The state-machine generation system 1400 includes an analysis component and a generation component (not shown). The analysis component can analyze target query-language semantics including grammar and type system to determine constraints or restrictions on the target query language, where the grammar describes acceptable syntax and the type system describes proper usage of data types. Based on the analysis, the generation component can produce a state machine (e.g., state machine component), such as the workflow instances 210A, 210B and 210C in the form of state machines as depicted in FIG. 2, that captures constraints on the target query language. In one embodiment, the state machine can be type-based or the generation component can produce a state machine of types. In this case, states can be encoded as types and transitions between states can be encoded as methods. The generation component can also receive one or more parameters indicating a desired size and/or complexity of a generated state machine. As a result, the state machine can include all constraints specified by the grammar and type system, a subset of the constraints, or even a superset of the constraints.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of mapping events to workflow instances by a controller in a network, comprising:
   receiving an event message with an embedded token from an event source associated with one of a plurality of applications, the event message corresponding to occurrence of an event triggered at the event source;
   receiving, from a serverless system, a workflow specification which defines a workflow template for a workflow of events and that specifies a location of the token embedded in the event message, the event token being different for each of the plurality of applications;
   parsing the workflow specification to identify the location of the token embedded in the event message and storing the location of the token embedded in the event message into storage;
   extracting, by a processor, the token embedded in the event message using the location of the token identified in the storage; and
   mapping, by the processor, the event to a workflow instance of the one of the plurality of applications based on the token extracted from the event message to maintain a state of the workflow of events for the one of the plurality of applications which is mapped to the workflow instance.

2. The method of claim 1, wherein the mapping further comprises:
   creating the workflow instance;
   adding an entry in a table of memory including a mapping of the token extracted from the event message to the workflow instance; and
   sending the event associated with the token to the workflow instance associated with the token for processing.

3. The method of claim 1, wherein the mapping further comprises:
   retrieving an entry from a table in memory, the entry including a mapping of the token extracted from the event message to the workflow instance; and
   sending the event to the workflow instance identified in the entry using the token.

4. The method of claim 1, wherein the workflow specification is instantiated as the workflow instance when events including the token embedded in the event message are received from the event source of the one of the plurality of applications.

5. The method of claim 1, wherein the workflow specification defines an internal state machine and the event that triggers a state in the internal state machine.

6. The method of claim 1, wherein the token is used to associate a group of events within the same workflow instance.

7. A controller for mapping events to workflow instances in a network, comprising:
   a non-transitory memory storage comprising instructions; and
   one or more processors in communication with the memory, wherein the one or more processors execute the instructions to:
     receive an event message with an embedded token from an event source associated with one of a plurality of applications, the event message corresponding to occurrence of an event triggered at the event source;
     receive a workflow specification which defines a workflow template for a workflow of events and specifying a location of the token embedded in the event message, from a serverless system, the token being different for each of the plurality of applications;
     parse the workflow specification and storing the location of the token embedded in the event message into storage;
     extract, by a processor, the token embedded in the event message using the location of the token identified in the storage; and
     map the event to a workflow instance of one of the plurality of applications based on the token extracted from the event message to maintain a state of the workflow of events from the one of the plurality of applications which is mapped to the workflow instance.

8. The controller of claim 7, wherein the one or more processors further execute the instructions to:
   create the workflow instance;
   add an entry in a table of memory including a mapping of the token extracted from the event message to the workflow instance; and
   send the event associated with the token to the workflow instance associated with the token for processing.

9. The controller of claim 7, wherein the one or more processors further execute the instructions to:

retrieve an entry from a table in memory, the entry including a mapping of the token extracted from the event message to the workflow instance; and send the event to the workflow instance identified in the entry using the token.

10. The controller of claim 7, wherein the workflow specification is instantiated as the workflow instance when events including the token embedded in the event message are received from the event source of the one of the plurality of applications.

11. The controller of claim 7, wherein the workflow specification defines an internal state machine and the event that triggers a state in the internal state machine.

12. The controller of claim 7, wherein the token is used to associate a group of events within the same workflow instance.

13. A non-transitory computer-readable medium storing computer instructions for mapping events to workflow instances by a controller in a network, that when executed by one or more processors, cause the one or more processors to perform the steps of:

receiving an event message with an embedded token from an event source associated with one of a plurality of applications, the event message corresponding to occurrence of an event triggered at the event source;

receiving, from a serverless system, a workflow specification which defines a workflow template for a workflow of events and that specifies a location of the token embedded in the event message, the event token being different for each of the plurality of applications;

parsing the workflow specification and storing the location of the token embedded in the event message into storage;

extracting, by a processor, the token embedded in the event message using the location of the token identified in the storage; and mapping, by the processor, the event to a workflow instance of the application based on the token extracted from the event message to maintain a state of the workflow of events for the one of the plurality of applications which is mapped to the workflow instance.

14. The non-transitory computer-readable medium of claim 13, wherein the one or more processors further to perform the steps of:

creating the workflow instance;

adding an entry in a table of memory including a mapping of the token extracted from the event message to the workflow instance; and sending the event associated with the token to the workflow instance associated with the token for processing.

15. The non-transitory computer-readable medium of claim 13, wherein the one or more processors further to perform the steps of:

retrieving an entry from a table in memory, the entry including a mapping of the token extracted from the event message to the workflow instance; and sending the event to the workflow instance identified in the entry using the token.

16. The non-transitory computer-readable medium of claim 13, wherein the workflow specification is instantiated as the workflow instance when events including the token embedded in the event message are received from the event source of the one of the plurality of applications.

* * * * *

UNITED STATES PATENT AND TRADEMARK OFFICE
CERTIFICATE OF CORRECTION

PATENT NO. : 11,294,740 B2
APPLICATION NO. : 16/544601
DATED : April 5, 2022
INVENTOR(S) : Zhang et al.

It is certified that error appears in the above-identified patent and that said Letters Patent is hereby corrected as shown below:

In the Claims

Column 20, Line 10 (Claim 14, Line 2), please replace "further to" with --further--

Column 20, Line 20 (Claim 15, Line 2), please replace "further to" with --further--

Signed and Sealed this
Fifth Day of July, 2022

Katherine Kelly Vidal
*Director of the United States Patent and Trademark Office*